United States Patent [19]

Eaton

[11] Patent Number: 4,876,608

[45] Date of Patent: Oct. 24, 1989

[54] FOCUS AND SIGNAL TO NOISE MEASUREMENT ROUTINES IN INPUT SCANNERS

[75] Inventor: Richard B. Eaton, Rochester, N.Y.

[73] Assignee: Xerox Corporation, Stamford, Conn.

[21] Appl. No.: 268,091

[22] Filed: Nov. 7, 1988

[51] Int. Cl.$^4$ .......................... H04N 1/32; H04N 1/40
[52] U.S. Cl. ..................................... 358/443; 358/471
[58] Field of Search ......................... 358/280, 293, 294

[56] References Cited

U.S. PATENT DOCUMENTS

| | | | |
|---|---|---|---|
| 4,123,778 | 10/1978 | Graf et al. | 358/107 |
| 4,427,998 | 1/1984 | Huntoon | 358/294 |
| 4,464,681 | 8/1984 | Jacobs | 358/294 |
| 4,631,598 | 12/1986 | Burkhardt | 358/293 |
| 4,691,343 | 9/1987 | Tenenbaum | 358/281 |
| 4,707,615 | 11/1987 | Hosaka | 358/294 |
| 4,743,974 | 5/1988 | Lockwood | 358/285 |

*Primary Examiner*—Howard W. Britton
*Attorney, Agent, or Firm*—Mark Costello

[57] ABSTRACT

Imaging quality is measured in an electronic input scanner using the scanner imaging processing electronics. A contrast transfer function (CTF) of an optical system in an electronic input scanner is measured to determine focus quality by scanning a test pattern of lines, extending generally parallel with the slow scan direction, with no relative motion between the scanning element and the test pattern. The output of the scanning process is directed through the device thresholding operation. A series of successive scan lines are produced in this manner, each line produced with a successively incremented threshold level applied. The output of the thresholding device is examined at a plurality of locations to determine maximum and minimum transition points associated with the variation of threshold levels. Upon detection of the maximum and minimum, CTF is calculated using the threshold transition values. Signal to noise ratio is measured similarly by scanning a test pattern having a uniform gray image. A series of successive scan lines are produced, each line with a successively incremented threshold level applied. Noise causes producing a non-uniform scan line. The noise is measured by examining the number of lines where a non-uniform output is produced. Upon detection of the first and last non-uniform lines, signal to noise ratio can be calculated. For both tests, the scan lines produced may be printed in a standard binary printer allowing a qualitative examination of the results.

10 Claims, 15 Drawing Sheets

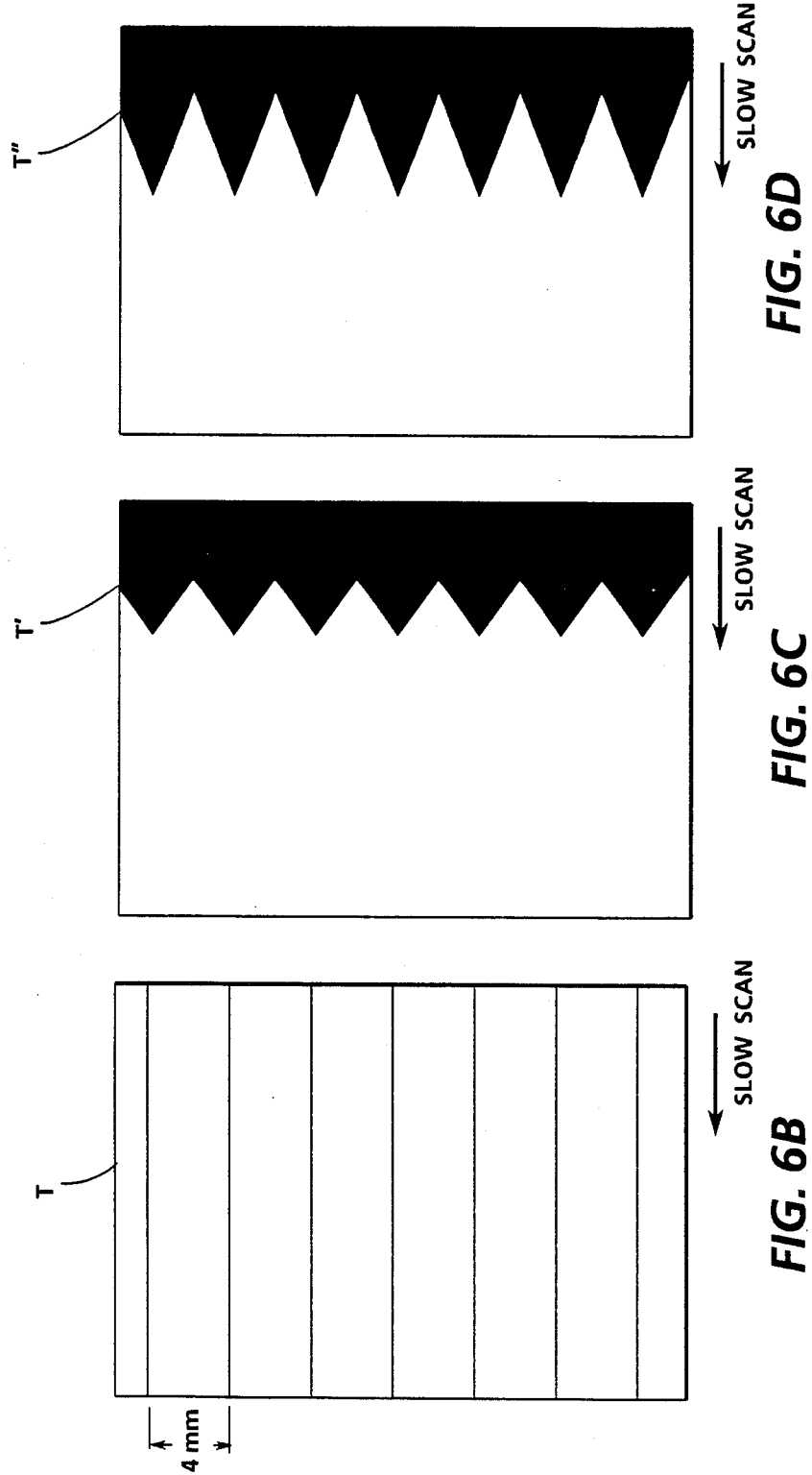

|     | 1 | 2 | 3 | 4 | 5 | 6 | 7 | 8 | 9 | 10 | 11 | 12 |
|-----|---|---|---|---|---|---|---|---|---|----|----|----|
| 50  | 1 | 1 | 1 | 1 | 1 | 1 | 1 | 1 | 1 | 1  | 1  | 1  |
| 60  | 1 | 1 | 1 | 1 | 1 | 1 | 1 | 1 | 1 | 1  | 1  | 1  |
| 70  | 1 | 1 | 1 | 1 | 1 | 0 | 0 | 1 | 1 | 1  | 1  | 1  |
| 80  | 1 | 1 | 1 | 1 | 0 | 0 | 0 | 0 | 1 | 1  | 1  | 1  |
| 90  | 1 | 1 | 1 | 1 | 0 | 0 | 0 | 0 | 1 | 1  | 1  | 1  |
| 100 | 1 | 1 | 1 | 0 | 0 | 0 | 0 | 0 | 0 | 1  | 1  | 1  |
| 110 | 1 | 1 | 1 | 0 | 0 | 0 | 0 | 0 | 0 | 1  | 1  | 1  |
| 120 | 1 | 1 |   | 0 | 0 | 0 | 0 | 0 | 0 |    | 1  | 1  |
| 130 | 1 | 1 | 0 | 0 | 0 | 0 | 0 | 0 | 0 | 0  | 1  | 1  |
| 140 | 1 | 1 | 0 | 0 | 0 | 0 | 0 | 0 | 0 | 0  | 1  | 1  |
| 150 | 1 |   | 0 | 0 | 0 | 0 | 0 | 0 | 0 | 0  |    | 1  |
| 160 | 1 | 0 | 0 | 0 | 0 | 0 | 0 | 0 | 0 | 0  | 0  | 1  |
| 170 | 1 | 0 | 0 | 0 | 0 | 0 | 0 | 0 | 0 | 0  | 0  | 1  |
| 180 | 0 | 0 | 0 | 0 | 0 | 0 | 0 | 0 | 0 | 0  | 0  | 0  |
| 190 | 0 | 0 | 0 | 0 | 0 | 0 | 0 | 0 | 0 | 0  | 0  | 0  |
| 200 | 0 | 0 | 0 | 0 | 0 | 0 | 0 | 0 | 0 | 0  | 0  | 0  |

*FIG. 7B*

|     | 1 | 2 | 3 | 4 | 5 | 6 | 7 | 8 | 9 | 10 | 11 | 12 |
|-----|---|---|---|---|---|---|---|---|---|----|----|----|
| 50  | 1 | 1 | 1 | 1 | 1 | 1 | 1 | 1 | 1 | 1  | 1  | 1  |
| 60  | 1 | 1 | 1 | 1 | 1 | 1 | 1 | 1 | 1 | 1  | 1  | 1  |
| 70  | 1 | 1 | 1 | 1 | 1 | 1 | 1 | 1 | 1 | 1  | 1  | 1  |
| 80  | 1 | 1 | 1 | 1 | 1 | 1 | 1 | 1 | 1 | 1  | 1  | 1  |
| 90  | 1 | 1 | 1 | 1 | 1 | 1 | 0 | 1 | 1 | 1  | 1  | 1  |
| 100 | 1 | 1 | 1 | 0 | 1 | 1 | 0 | 0 | 1 | 1  | 1  | 1  |
| 110 | 1 | 1 | 1 | 0 | 1 | 0 | 0 | 0 | 1 | 0  | 1  | 1  |
| 120 | 1 | 0 | 1 | 0 | 0 | 0 | 0 | 0 | 0 | 0  | 1  | 1  |
| 130 | 1 | 0 | 1 | 0 | 0 | 0 | 0 | 0 | 0 | 0  | 0  | 1  |
| 140 | 0 | 0 | 0 | 0 | 0 | 0 | 0 | 0 | 0 | 0  | 0  | 1  |
| 150 | 0 | 0 | 0 | 0 | 0 | 0 | 0 | 0 | 0 | 0  | 0  | 0  |
| 160 | 0 | 0 | 0 | 0 | 0 | 0 | 0 | 0 | 0 | 0  | 0  | 0  |
| 170 | 0 | 0 | 0 | 0 | 0 | 0 | 0 | 0 | 0 | 0  | 0  | 0  |
| 180 | 0 | 0 | 0 | 0 | 0 | 0 | 0 | 0 | 0 | 0  | 0  | 0  |
| 190 | 0 | 0 | 0 | 0 | 0 | 0 | 0 | 0 | 0 | 0  | 0  | 0  |
| 200 | 0 | 0 | 0 | 0 | 0 | 0 | 0 | 0 | 0 | 0  | 0  | 0  |

*FIG. 9A*

|     | 1 | 2 | 3 | 4 | 5 | 6 | 7 | 8 | 9 | 10 | 11 | 12 |
|-----|---|---|---|---|---|---|---|---|---|----|----|----|
| 50  | 1 | 1 | 1 | 1 | 1 | 1 | 1 | 1 | 1 | 1  | 1  | 1  |
| 60  | 1 | 1 | 1 | 1 | 1 | 1 | 1 | 1 | 1 | 1  | 1  | 1  |
| 70  | 1 | 1 | 1 | 1 | 1 | 1 | 1 | 1 | 1 | 1  | 1  | 1  |
| 80  | 1 | 1 | 1 | 1 | 1 | 1 | 1 | 1 | 1 | 1  | 1  | 1  |
| 90  | 1 | 1 | 1 | 1 | 1 | 1 | 1 | 1 | 1 | 1  | 1  | 1  |
| 100 | 1 | 1 | 1 | 1 | 1 | 1 | 1 | 1 | 1 | 1  | 1  | 1  |
| 110 | 1 | 1 | 1 | 0 | 1 | 1 | 0 | 1 | 0 | 1  | 1  | 1  |
| 120 | 1 | 0 | 0 | 0 | 1 | 0 | 0 | 0 | 0 | 0  | 1  | 1  |
| 130 | 0 | 0 | 0 | 0 | 0 | 0 | 0 | 0 | 0 | 0  | 0  | 0  |
| 140 | 0 | 0 | 0 | 0 | 0 | 0 | 0 | 0 | 0 | 0  | 0  | 0  |
| 150 | 0 | 0 | 0 | 0 | 0 | 0 | 0 | 0 | 0 | 0  | 0  | 0  |
| 160 | 0 | 0 | 0 | 0 | 0 | 0 | 0 | 0 | 0 | 0  | 0  | 0  |
| 170 | 0 | 0 | 0 | 0 | 0 | 0 | 0 | 0 | 0 | 0  | 0  | 0  |
| 180 | 0 | 0 | 0 | 0 | 0 | 0 | 0 | 0 | 0 | 0  | 0  | 0  |
| 190 | 0 | 0 | 0 | 0 | 0 | 0 | 0 | 0 | 0 | 0  | 0  | 0  |
| 200 | 0 | 0 | 0 | 0 | 0 | 0 | 0 | 0 | 0 | 0  | 0  | 0  |

*FIG. 9B*

FOCUS AND SIGNAL TO NOISE MEASUREMENT ROUTINES IN INPUT SCANNERS

The present invention relates generally to on-line measurement of the quality of electronic image reproduction, and more particularly to a method of quantitatively and qualitatively measuring focus and signal to noise ratio in an electronic input scanner.

INCORPORATION BY REFERENCE

U.S. Pat. No. 4,743,974 to Lockwood, and U.S. patent application Ser. No. 124,123, filed Nov. 23, 1987 and assigned to the same assignee as the present application.

BACKGROUND OF THE INVENTION

The sensing system of an electronic input scanner detects intensity of light imagewise derived from an original image over a selected integration period, and for a discrete area viewed, assigns sensed light intensity a representative analog value ranging over a continuous scale of values. Thus, the output signal of the electronic input scanner is a function representing intensity of light from the image, whether reflected from or directed through the image. To obtain an optimum representation of the scanned image, the image acquisition system must be carefully focused. Focusing entails careful control of the relative positions of the original image on a document or other surface, the photosite or array of photosites detecting light from the original image, and the lens which directs light reflected from the document to the photosites. A number of factors can vary the focus of the system, including improper placement of the lens with respect to the original or the photosite, incorrect or imperfect placement of the original image with respect to the lens, or incorrect placement of the photosites. Real causes of these imperfections might be folds in a document, a warped supporting platen, an array of photosites that sags along the array, an array improperly mounted with respect to lens and document, a lens that changes in optical characteristics due to heat, etc. All these potential threats to focus must be reviewed, and may be adjustable to vary the total conjugate of the system, the front conjugate or the rear conjugate.

Present arrangements for achieving a selected focus assume correct manufacture and design. Lens/photosite array combinations are available as unitary constructs, thereby setting a fixed rear lens conjugate, for which a proper front conjugate may be defined in the design phase of a device. However, actual manufacturing tolerances affect these conjugates and thus may cause an out of focus condition. To determine focus of a system, a measurement referred to as CTF (Contrast Transfer Function) is sometimes used. In this measurement, a square wave signal is provided as an input to the optical system, and the output of the system is directly measured for the maximum and minimum responses. The measurement assumes that for each cycle of a square wave which has a positive and negative half cycles, at the midpoint of each half cycle, a maximum or minimum respectively should occur, respectively, because the output function should track the input function. CTF is defined as:

$$\frac{\text{max} - \text{min}}{\text{max} + \text{min}} \quad (1)$$

CTF is related to the modulation transfer function (MTF) of the system, but employs a less expensive test pattern for measurement.

Signal to noise ratio is also a factor in the quality of image reproduction from electronic input scanners. Many operational elements of electronic input scanners introduce noise into the output signal of the system, i.e., signal components added to the output signal which do not reflect the intensity function, commonly including elements which operate unpredictably over time. Variations in illumination of the image over time, variability in operation of photosites over time, or inappropriate operation of a converter for the conversion of analog signals derived from the photosites to digital signals for image processing, are all sources of noise. Signal to noise ratio is defined as $$\frac{\text{signal} + \text{noise}}{\text{noise}} \quad (2)$$

Typically measurements of either focus or signal to noise ratio are laboratory or bench tests requiring a testing apparatus, calibrated test patterns, and experienced test technicians. These measurements are impractical to make once the machine has been placed at a customer location, without removing the machine. These tests, while comprehensive and analytical, are also very time consuming and subject to error because of their complexity.

U.S. Pat. No. 4,123,778 to Graf demonstrates a determination of sharpness of an image through the evaluation of the absolute values of density differences between adjacent points of the image in at least one selected area of the image. Uniformity of printer operation is sometimes tested by supplying a ramp function to the printer, applying a threshold to the ramp, and observing the varying output result, which ideally should provide a white level converting into a black level when the ramp function value crosses the threshold.

SUMMARY OF THE INVENTION

In accordance with the invention there is provided an image processing arrangement suitable for on-line measurement of focus and/or signal to noise ratio either quantitatively or qualitatively.

In accordance with one aspect of the invention, CTF, a direct measurement value for focus, is measured in an electronic input scanner by scanning a test pattern of lines, extending generally parallel with the slow scan direction, with no relative motion between the scanning element and the test pattern. The output of the scanning process is directed through the device thresholding operation. A series of successive scan lines of data are produced in this manner, each scan line of data produced with a successively incremented threshold level applied to the data. The output of the thresholding operation is examined at a plurality of photosite locations to determine maximum and minimum transition points associated with the variation of threshold levels. Upon detection of the maximum and minimum, CTF is calculated numerically by using the threshold transition values.

In accordance with another aspect of the invention, focus is examined qualitatively by printing the successive scan line data produced with successively varied threshold level applied to the data with a binary output printer in normal operation. Transition points are then indicated by the change from one condition to the other, such as from black to white. The pattern produced appears roughly as a sawtooth function. The slope of the saw tooth from base to apex increases with improved focus.

In accordance with yet another aspect of the invention, signal to noise ratio is measured in an electronic input scanner by scanning a test pattern having a uniform gray across the image, with no relative motion between the scanning element and the test pattern. The output of the scanning process, is directed through the device thresholding operation. A series of successive scan lines are produced in this manner, each scan line produced with a successively varied threshold level applied to the data. Noise is shown in this test by producing a non-uniform scan line, even though the input was uniform and unchanging. The noise level is measured by examining the number of lines where a non-uniform output is produced. Upon detection of the first and last non-uniform lines, signal to noise ratio can be calculated.

In accordance with still another aspect of the invention, signal to noise ratio is examined qualitatively by printing the successive scan lines produced with successively varied threshold level applied to the data with a binary output printer in normal operation. The noise level will be apparent by the printing of scan lines that have a breakup associated therewith. The size of the area where breakup occurs corresponds to the noise level, and may be compared to the area where no breakup is noted.

The described methods of measurement of focus and signal to noise ratio form useful tests of electronic input devices. It is desirable to provide a quantitative test so that the machine performance may be evaluated with respect to a standard. It is also desirable to have a qualitative test so that improvement in the machine operation can be easily reviewed with little or no knowledge of machine standard operation. Comparison of operation after corrective action to improve device performance can then be easily made with a test from before corrective action was taken.

The described methods of measurement of focus and signal to noise ratio also use only in place hardware on the electronic input scanner. A device controller may be easily programmed for the test operation and production of test values. No additional testing apparatus is therefore required. Such tests could be performed as manufacturing tests as well as field tests.

These and other aspects of the invention will become apparent from the following description used to illustrate a preferred embodiment of the invention read in conjunction with the accompanying drawings in which:

FIGS. 6A, 6B, 6C and 6D show a test pattern for examining focus and printed results of the focus examinations;

Figure 7A:
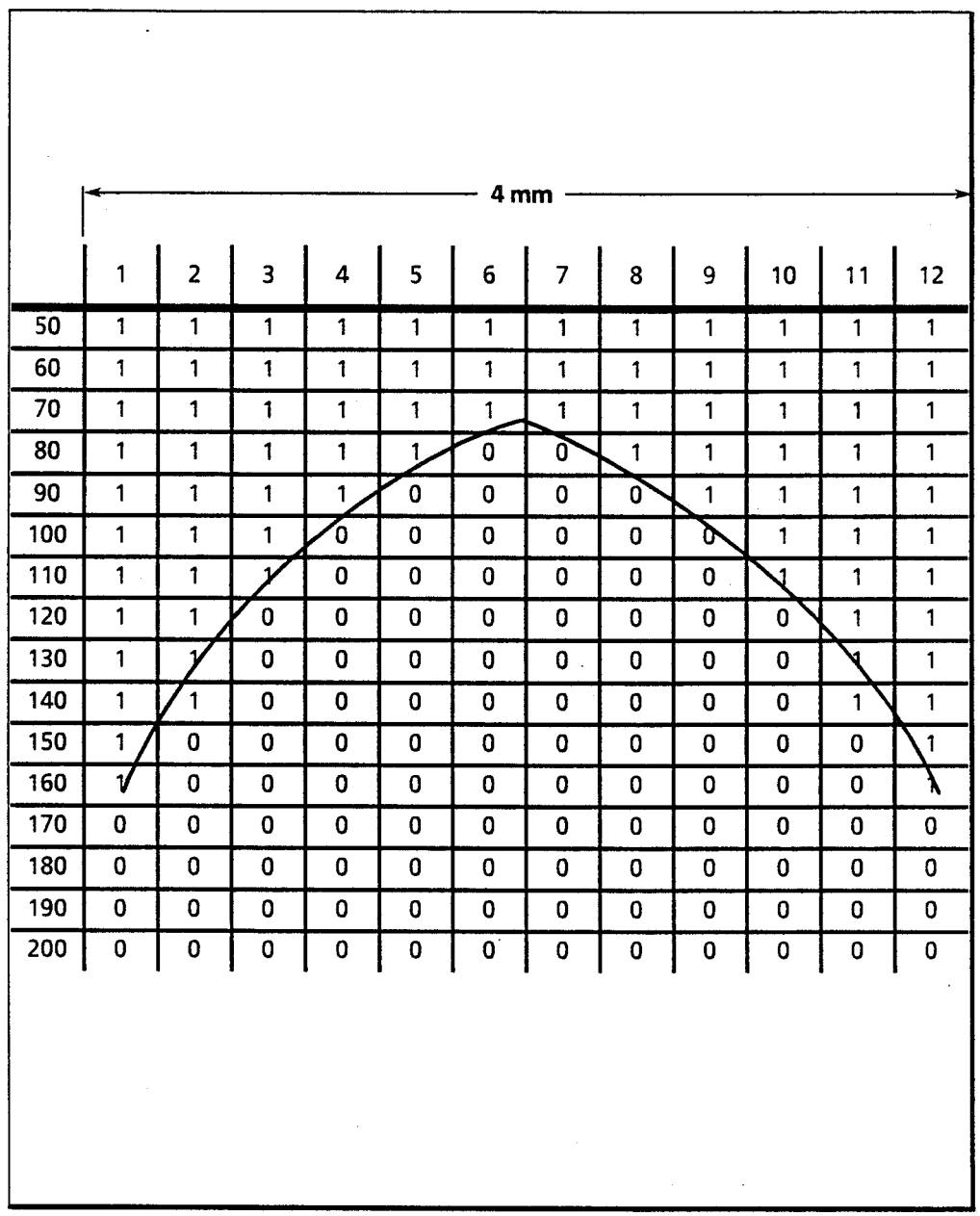
Figure 8A:
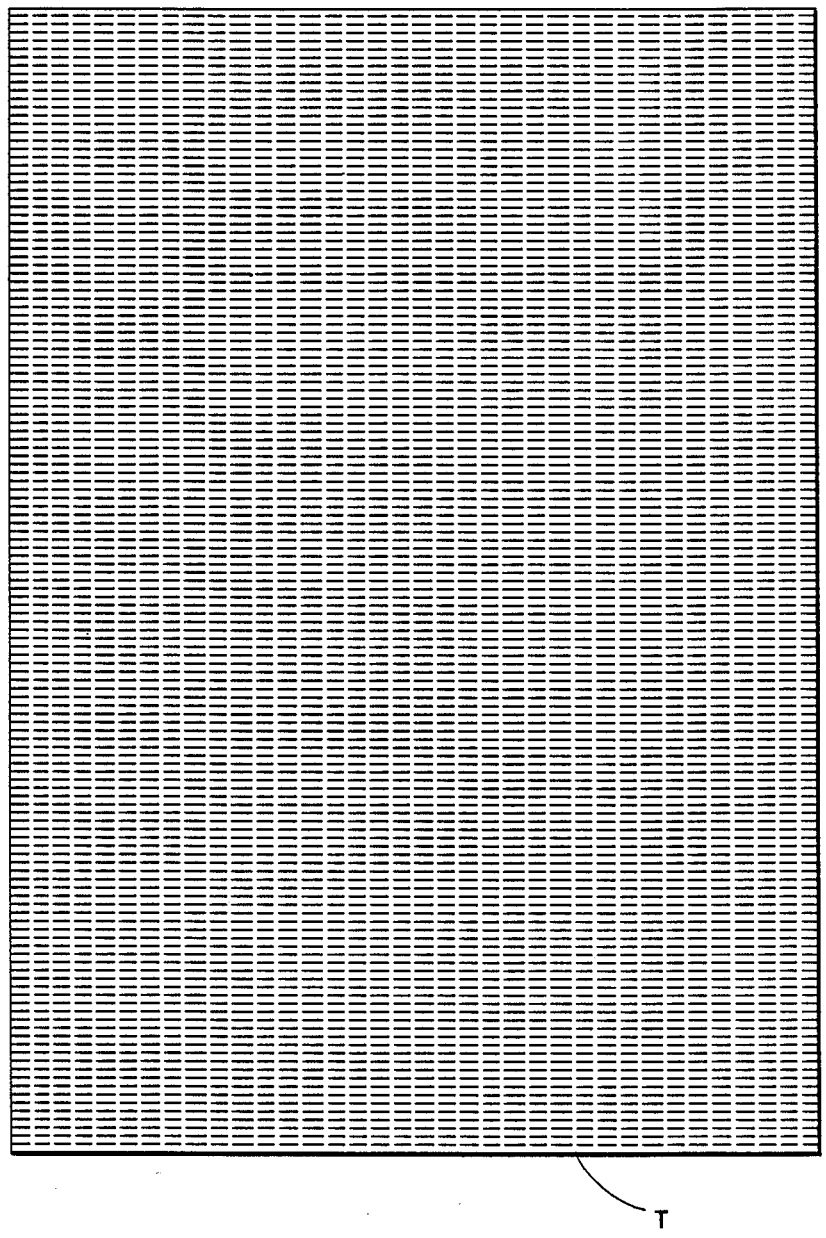
Figure 8B:
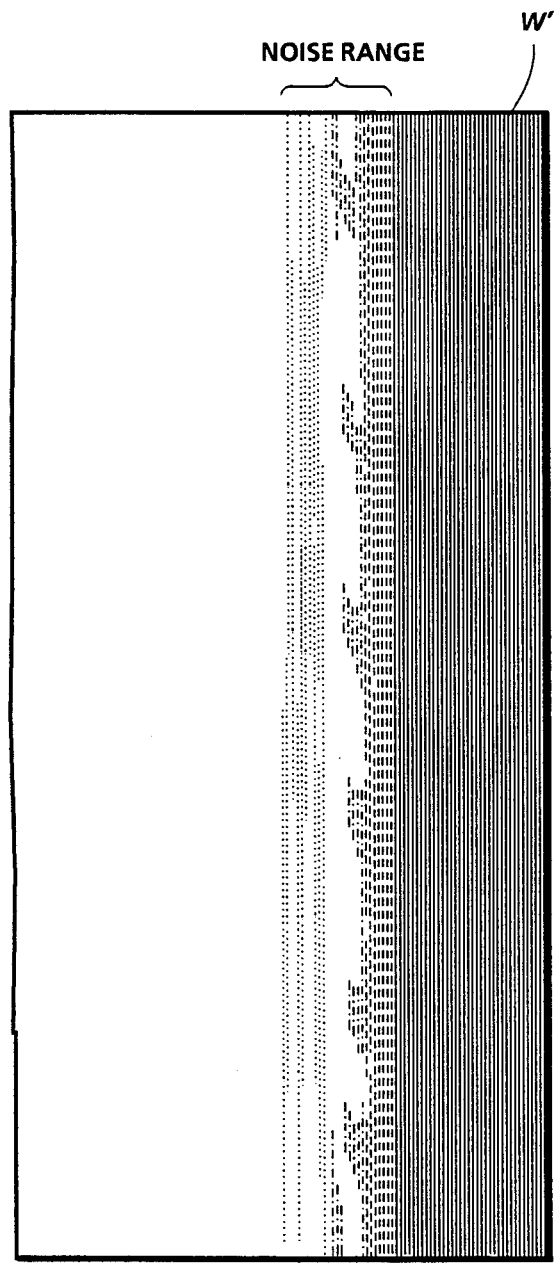
Figure 8C:
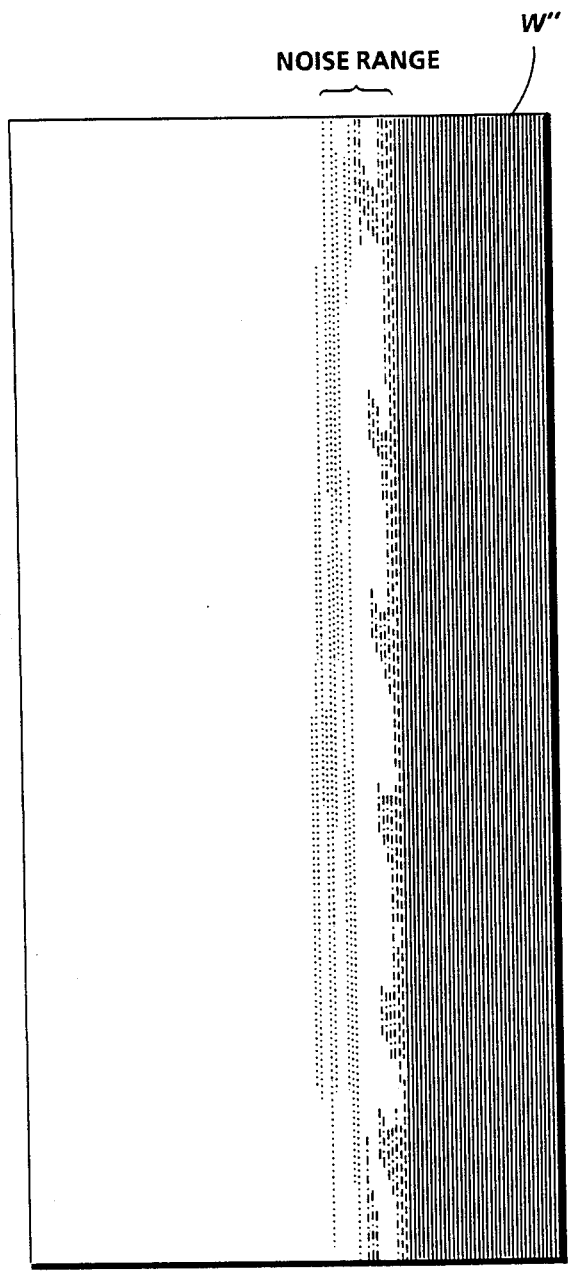
Figure 10:
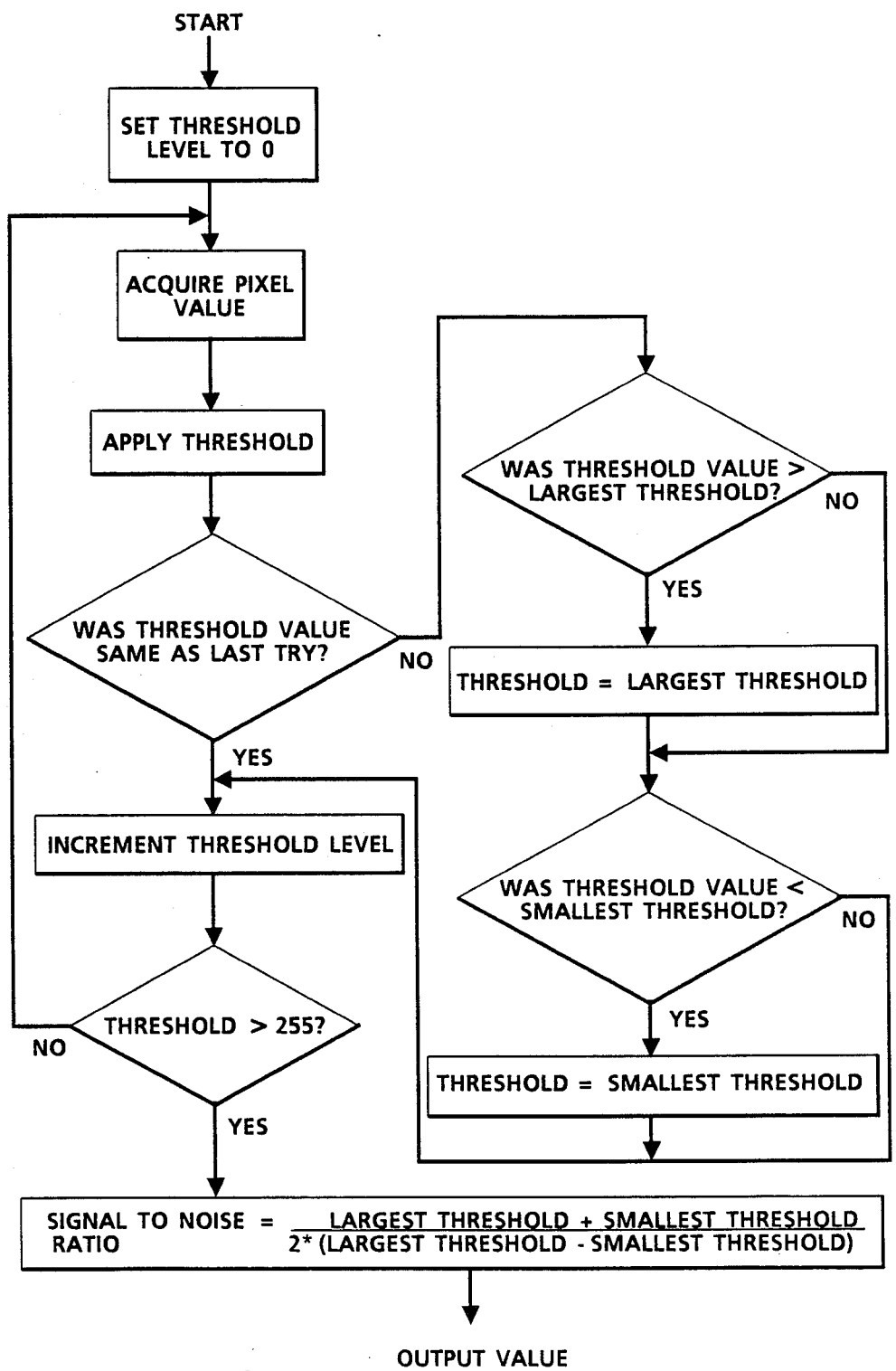
Figure 11:
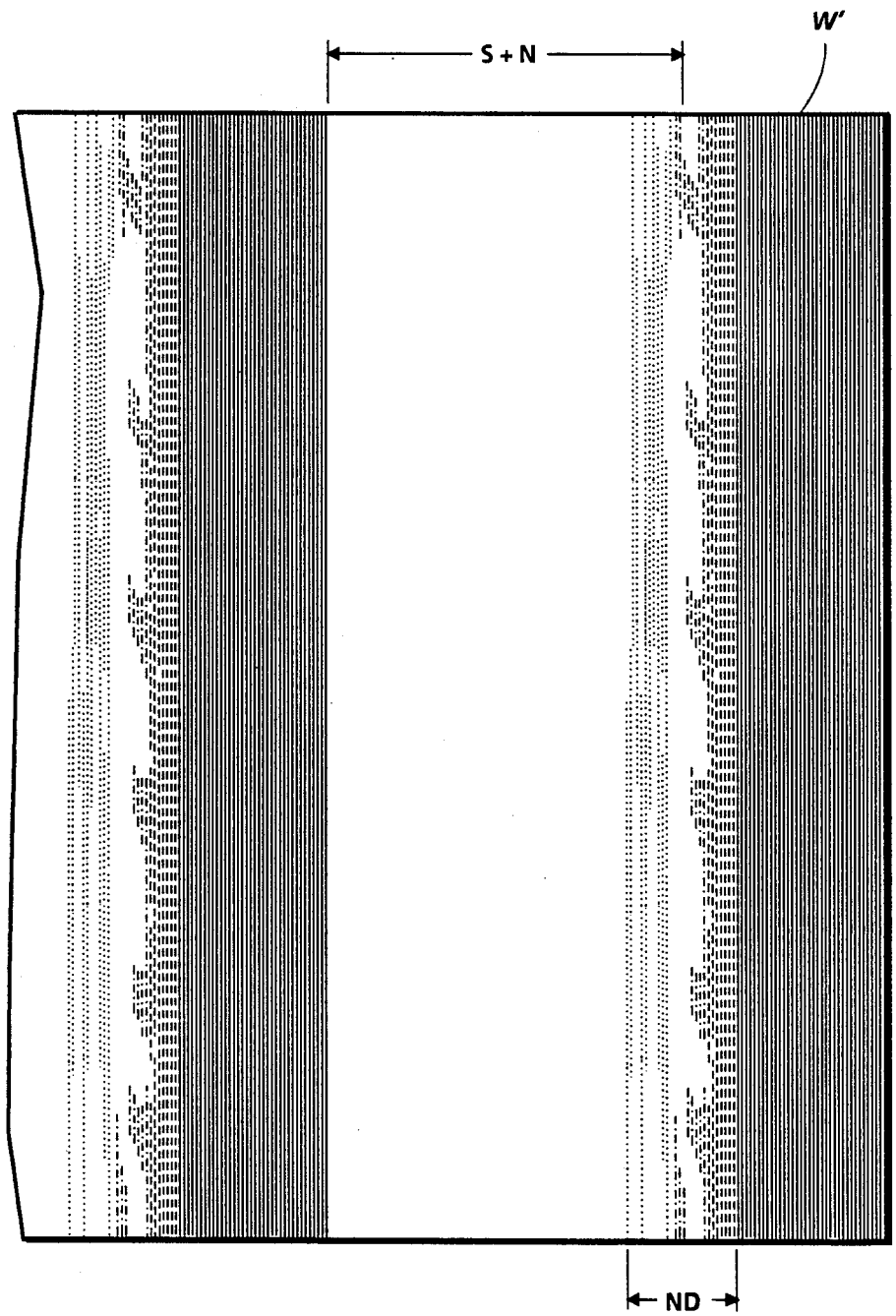

FIGS. 7A and 7B graphically demonstrate the CTF measurement for focus;

FIGS. 8A, 8B and 8C show a test pattern for examining signal to noise ratio and printed results of the signal to noise ratio examinations; and FIGS. 9A and 9B graphically demonstrate the measurement for signal to noise ratio; and FIG. 10 is a flow chart of a method for determining signal to noise ratio numerically in accordance with the invention; and FIG. 11 demonstrates an alternative method of measuring signal to noise ratio in accordance with the invention.

Digital image information in the form of image data picture elements, (hereinafter, pixels), digital voltage representations of image intensity at discrete locations in an image, is provided from a suitable source. For example, the image data pixels may be obtained through line by line scanning of an image bearing original by one or more photosensitive imaging devices, such as a multiple element array of charge coupled devices, commonly referred to as CCD's. Line by line scanning of an image bearing original for the derivation of image information is well known and does not form a part of the present invention. Scanning, as used herein refers to the derivation of image data by an image scanner. Scanning also refers to the motion of a laser sweeping across a charge retentive surface for the formation of a latent image thereon in a lasertype xerographic printer engine. The two uses will be easily distinguishable.

Figure 1:
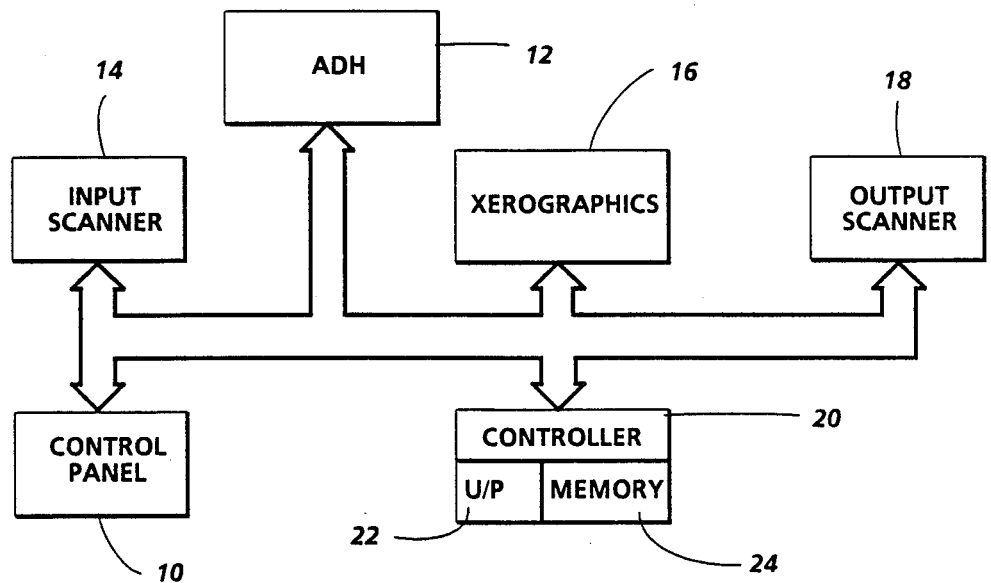
FIG. 1 shows a block diagram of the operative elements of one possible scanner/printer combination.

With reference now to the drawings, where the showings are for the purpose of illustrating a preferred embodiment of the invention and not for limiting same, FIG. 1 shows a block diagram of a scanner/printer combination useful for scanning images on a surface such as a sheet of paper, a transparency or a slide, to derive an electronic representation of the image, processing the electronic image data appropriately, and providing a printed output. Upon selection of the appropriate operation at a control panel 10, documents bearing images for scanning may be fed with an automatic document handler (ADH) 12 to an input scanner 14. In accordance with a scanned image, a xerographic print engine 16 with a laser output scanner 18 for creating a latent image on a charge retentive surface may be operated to produce an output image in accordance with the processed electronic image. A controller 20, or multiple controllers, includes a microprocessor controller 22 operating in response to instructions sets stored in memory 24, to conditions detected at various sensors throughout the arrangement, and to commands entered at control panel 10, to control the various elements or the arrangement. The arrangement shown is illustrative only, and may be varied in a number of ways. The scanner and printer need not be a part of the same device, and each may have separate control elements. An automatic document handler is not necessary if manual document placement at a scanning location is provided. While a zerographic engine is described, a number of different printer types and engines may easily be substituted. A CRT, LED, or LCD display may also be substituted for the output, as appropriate.

Figure 2:
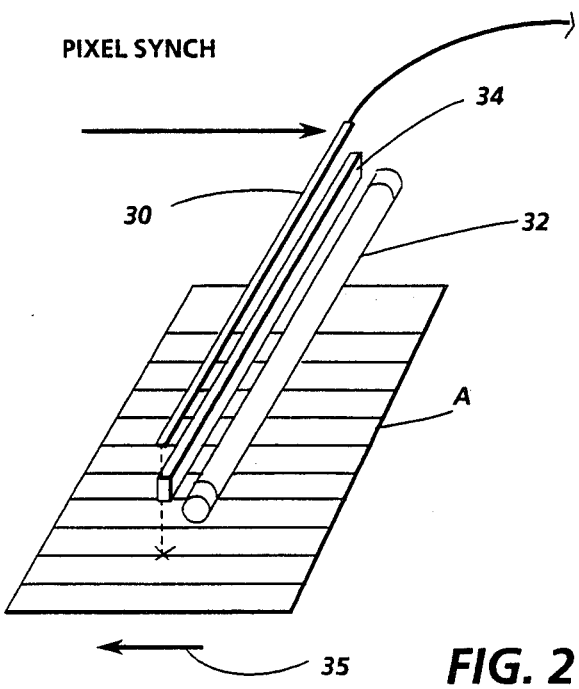
FIG. 2 shows the basic operative scanning elements of a line by line input scanner.

FIG. 2 shows an electronic input scanner arrangement in an application incorporating the present invention, similar in principle to that described in U.S. Pat.

No. 4,743,974 to Lockwood. In the described embodiment, image information or image data may be initially derived from an imaging device, typically a photosite array 30, which generates analog signals in accordance with exposure to light imagewise directed to the array from an original document A. An incandescent lamp 32 illuminates document A, directing light to the document, which is reflected through rod lens 34 which may comprise a bundle of image transmitting rod lens produced under the trademark of SELFOC manufactured by the Nippon Sheet Glass Co. Ltd., and directed to the photosite array. Relative motion in the slow scan direction indicated by the arrow 35 is provided between the document and scanning array, as provided for example, by U.S. Pat. No. 4,743,974 to Lockwood where either the document is moved past the scanning array, or the scanning array is moved past the document. A pixel synch signal to the array controls the integration period over which data is acquired from the photosite array. A wide range of photosites array types, including a flying spot type scanner, as well as arrays of photosensitive elements, lens types other than the fiber lens described and lamp types may be substituted for those shown and described. The document described could be any image information carrying substrate, including a transparency, a photograph, a slide, paper, etc, with the illuminating lamp varied in type and position accordingly.

Figure 3:
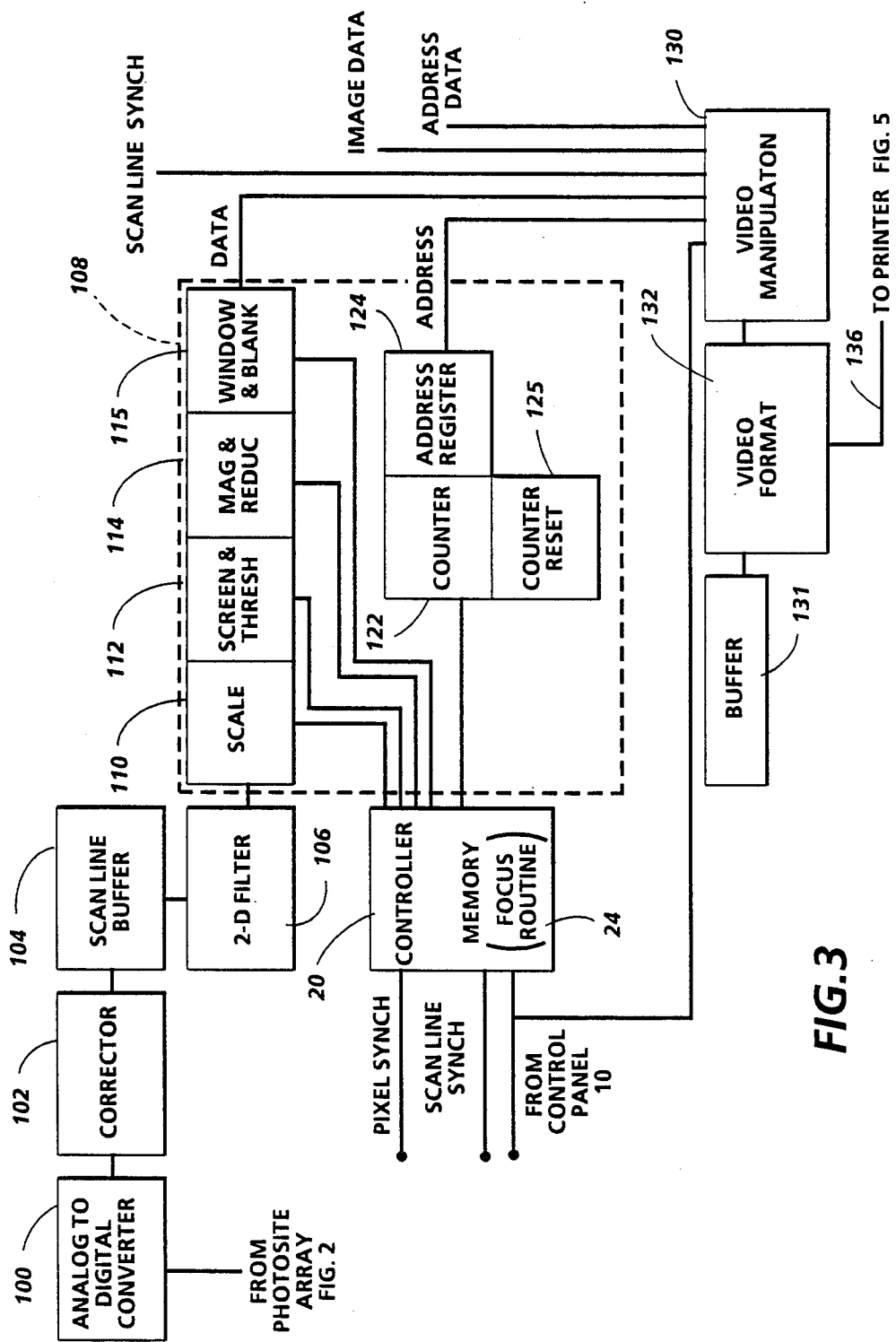
FIG. 3 shows a block diagram of the operative elements of the image processing portion of a line by line input scanner.

With reference to FIG. 3, an image processing arrangement similar to U.S. patent application Ser. No. 124,123, image data is periodically removed from the photosites in accordance with a pixel synch signal, and directed to an analog to digital converter 100, functionally adjacent to the scanning array, for the conversion of the analog data to an 8 bit data byte, for example. At corrector 102, the nowdigital data is normalized against a predetermined calibration to account for discrepancies in the sensitivity of each photosite. The data may be deskewed to account for the order in which data is derived from each photosite in the array, and correction algorithms account for bad photosite element locations in the array by various interpolation and bad pixel discarding routines. Corrected data is stored into scan line buffer 104, which stores a plurality of scan lines for operation of the two dimensional filter 106. Two dimensional filter 106 detects and converts halftone screened data derived by the scanner into grey data for the prevention of moire effects. Because filtering routines useful in the conversion require information about the neighbors to any particular pixel, scan line buffer 104 provides two dimensional filter 106 with data for groups of adjacent scan lines. It will, of course, be appreciated that while the data line is illustrated as a single line, the 8 bit data byte may be transmitted from device to device along 8 parallel data transmission lines.

One dimensional image processor 108 is provided for operation on the data along each scan line, performing many common operations expected in image processing devices. Each of several processing function circuits, including for example scaling circuit 110, screening and thresholding circuit 112, magnification and reduction circuit 114, and window and blanking circuit 115 are enabled by controller 20 for operation on data passing through one dimensional image processor 108. Controller 20 is responsive to operator commands through control panel 10, and selection of processing functions, to cause controller logic to enable processing function circuits 110, 112, 114, 115. Pixel clock and scan line synch signals are directed through controller 20 for control of the various image processing operations at appropriate points in the stream of data. Device memory 24, in this case indicating the focus routine stored therein, is accessible through controller 20 to control the operation of the various functions in accordance with predetermined routines. All or part of the memory functions in the described arrangement could be located on a removable memory medium such as a floppy disk, or the like. In addition to these operations, one-dimensional image processor 106 produces an address for each image data byte in a scan line, as additional data for combination with each image data byte passing therethrough. Counter 122 is driven by controller 20 in accordance with a clocking or pixel synch signal to controller 20 to produce a multi-bit address designation or token indicative of the position along the scan line of the image data byte passing through one dimensional image processor 108. Counter 122 incrementally loads latch or address register 124 with an address token for output with the image data byte. Periodically, the counter is reset to indicate a new scan line, by counter reset 125, in accordance with the scan line synch signal. The result is that each addressed data byte has associated with it an address defining an ultimate location along the scan line, as well as information regarding its intensity. Each data byte, now positiondefined by an address token, is passed to a video manipulation device 130. At this device, image manipulation desired by a user is applied to data. New image data and new address data may be supplied for varying the sensed data or its address. Subsequent to video manipulation, data bytes manipulated in the video manipulation device 130 are transferred to the video format device 132. Video format device 132 combines the addessed data in buffer 134, combining data in accordance with the correct position along the scan line, and directing the addressed data bytes to the final address for transmission to a printer along line 136. Other image processing arrangements are possible, assuming that they provide an arrangement for selectively applying a threshold level to the pixel data from the scanned image.

Figure 4:
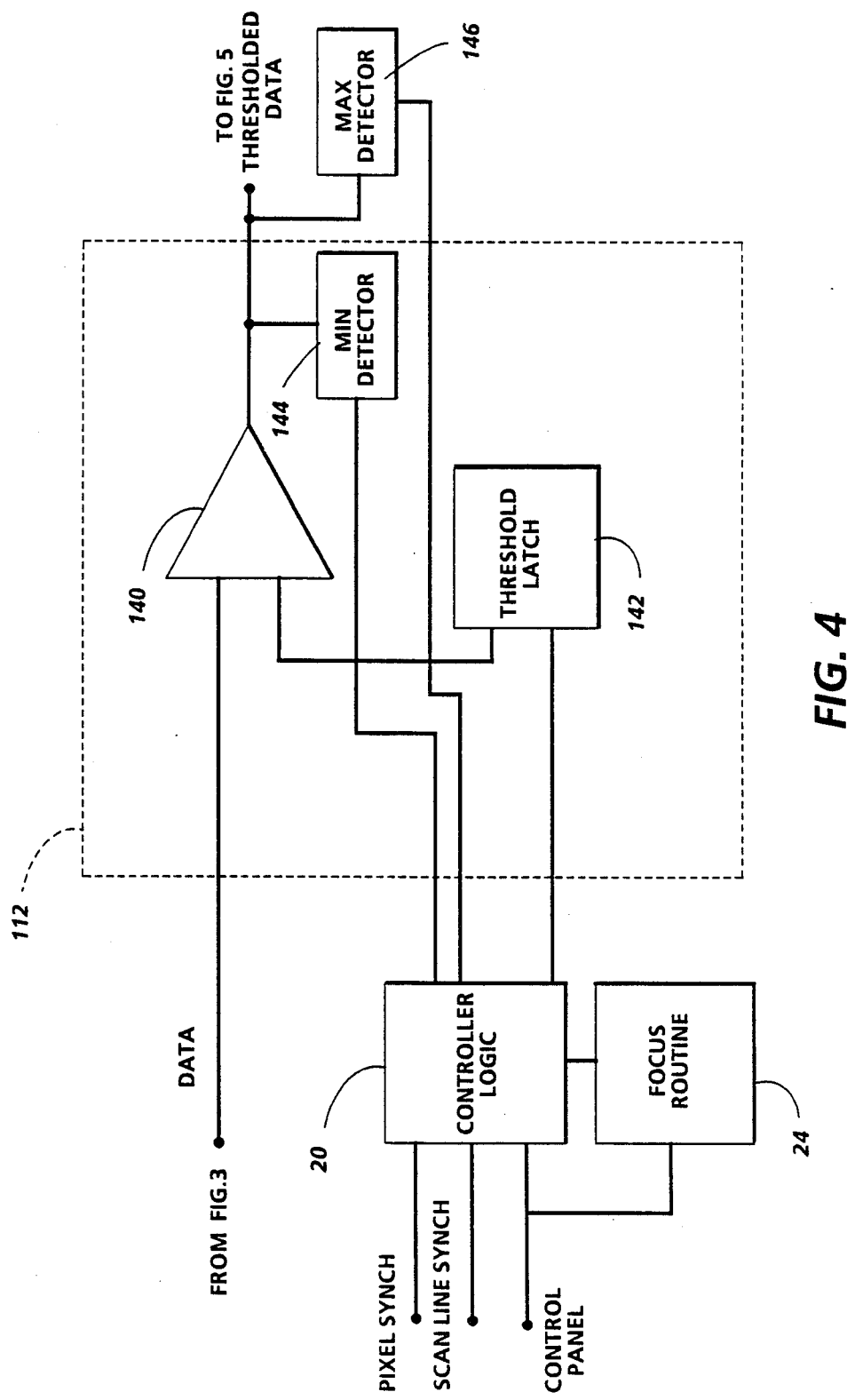
FIG. 4 shows a block diagram of the operative elements of a thresholding device in the input scanner of FIG. 3.

With reference to FIG. 4, threshold device 112 in one dimensional filter 108 includes comparator 140 for comparing scanned image data with a threshold level stored in threshold memory or latch 142, to provide a two level output based on the comparison. In a common threshold operation, if the scanned image data has an intensity value less than the threshold level, a white level will be output. If the scanned image data has an intensity value greater than the threshold level, a black level will be output. In accordance with the focus routine stored in memory 24, and the scan line synch signal a threshold value is stored in the threshold memory 142 by controller 20.

Figure 5:
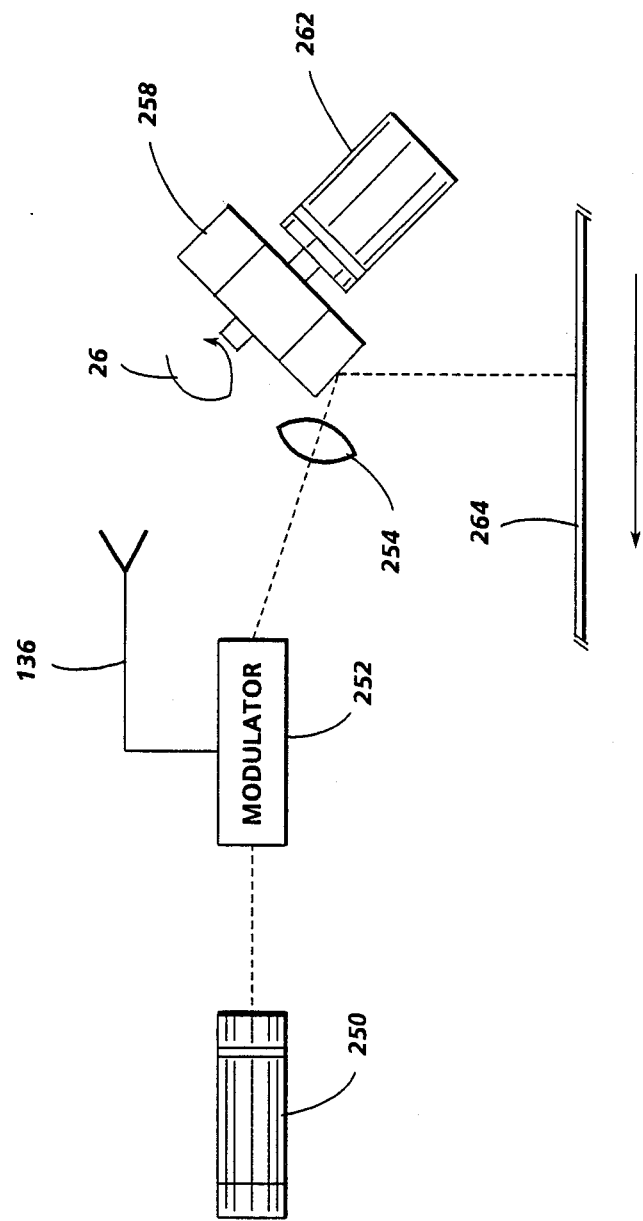
FIG. 5 shows a printer for printing the scanned image derived at the scanner of FIG. 2.

With reference now to FIG. 5, a standard xerographic laser printer is shown including a source of collimated light, or a laser 250, a modulator 252, which modulates laser light in accordance with the binary signal provided from the image processing section along line 136. Light from modulator 252 is focused through lens 254 on polygon 258 driven in rotating motion 260 by motor 262, to scan collimated light across a charge retentive surface 264 in a fast scan direction with the movement of the polygon for the formation of images thereon, while charge retentive surface 264 moves in the slow scan direction, labeled 266. The formation of latent images with a laser in xerographic engines is well known, as is the development and transfer of those images to a final substrate such as a sheet of paper. Of course, alternative printer types and engines may be substituted.

Figure 6A:
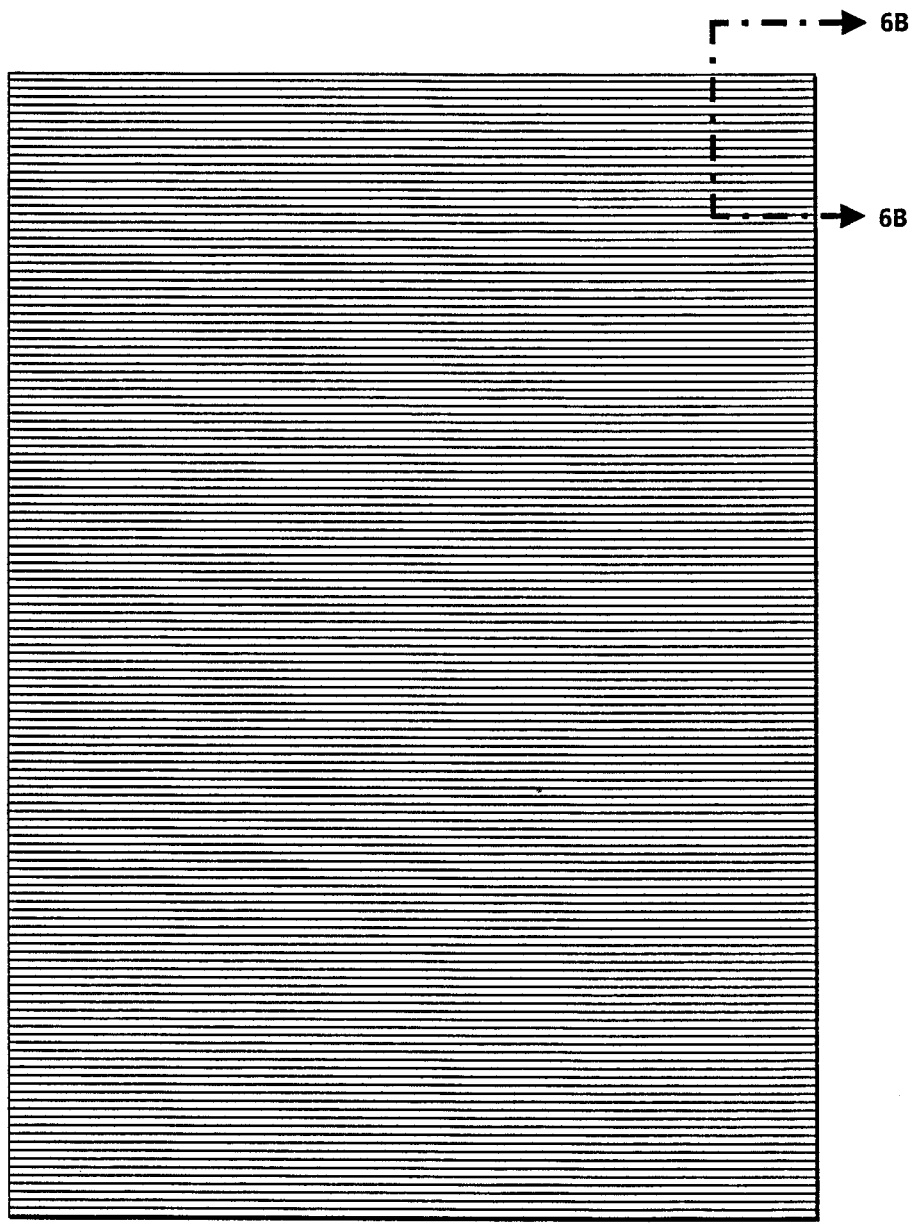

With reference again to FIG. 3 and 4, when it is desired to examine focus of the input scanner, a focus evaluation routine stored in memory 24 is selected through control panel 10 to cause controller 20 to execute a set of instructions for the examination of focus. With reference to FIGS. 6A and 6B, a test pattern T, is positioned for scanning by the photosite array, either manually, or automatically. The focus evaluation routine stops relative movement of the array of photosites and the test pattern at a position allowing the photosite array to view the pattern. Conveniently, the test pattern may be printed on a document, transparency, or slide for scanning, and includes a pattern of parallel lines extending in the slow scan direction when scanned. There is no particular requirement for the line quality, either in uniformity, or straightness, or number, although it is preferable that the lines be relatively straight and uniform. Standard lithographic printing techniques produce adequate test patterns. The line density of the test pattern is selected to produce a meaningful measurement of CTF. Too small a density and the CTF becomes unresponsive to variations in focus while if there is too great a density, measured CTF will be lost in the noise of the system. For the prevention of moire, the number also should not be an integer multiple of the number of photosites in an array. A test pattern line density of 4 line pairs per mm has been found to work well, although a large number of values greater and lesser would also work adequately. It will be appreciated that while the document is represented with lines extending across the page, lines are required to be only where focus is being measured. Also, it will be understood that with no relative movement, the lines appear more or less as a square wave function to the photosites, with sharply defined maxima and minima. By "lines", it is meant a pattern that will give the appearance of a square wave to the photosites, and of course, other designs or geometric figures giving the same result are equally applicable to the invention.

With reference to FIG. 4, for scanning, controller 20 operating in response to the stored focus evaluation routine, causes a number of scan lines of derived data to be produced. For each scan line, the threshold level stored in threshold latch 142 is incremented by a preselected value. While in an 8 bit system there are theoretically 256 threshold levels that could be applied to the data, in real systems operation, there is usually a somewhat smaller number of levels that can be applied, due to the inherent offset and gain response of the photosites not being perfect. Supposing for example that there are about 200 levels available between white and black once correction has been accomplished, 200 scan lines might be generated, beginning at the lowest threshold level and moving to the highest threshold level. Of course, a smaller number of levels could be used, dispersed through the range of levels. It would also be possible to generate multiple scan lines for a single threshold level, thus giving a measure of statistical confirmation to the measurement. The application of the threshold levels could also conveniently begin at the highest threshold level available and proceed to the lowest.

As demonstrated in FIGS. 7A and 7B, which show imaginary data simulating a focus result that might be expected, scan lines for each threshold level, after the threshold is applied, will produce a pattern of binary ones and zeroes, with the ones clustered about the position of the lines on the test pattern. FIGS. 7A and 7B, represent a poorly focused system and a well focused system, respectively. In a well focused system, such as FIG. 7B, the transition from ones to zeros occurs along a line sharply sloped to following the square wave, with a high slope from the base of the curve to its peak. In a poorly focused system of FIG. 7A, the transition will occur more gradually. In either case, CTF can be calculated by looking at a number of pixels, and for the group of pixels, finding the minimum transition point, the maximum transition point and calculating. To this end, functionally adjacent to the thresholding device 112 of Figure 4, are minimum and maximum detectors, 144 and 146 respectively, which detect over a selected group of photosites, the first transition threshold level from one to 0 as the minimum and the last transition from one to zero, as the maximum for use by the controller to determine the CTF equation $$\frac{max - min}{max + min} \quad (1)$$

The calculation of CTF may then be available at the control panel 10.

Once the scan lines are generated with the series of successive thresholds applied, the scan lines can be printed in a printer as shown in FIG. 4, operating in a standard fashion, to produce the output patterns T' and T" of FIGS. 6C and 6D from the test patterns of FIGS. 6A and 6B. These patterns show the variations resulting in the output wave form from improving focus. It is contemplated that a technician could compare the output with a standard, or compare successive tests after taking action to improve focus, noting the change of slope of the saw tooth. Methods of improving the clarity or visibility of the focus variations in the qualitative test may be used, such as, for example, printing each scan line a selected number of times to make the pattern larger.

Signal to noise ratio in the operation of the scanner can be examined in a similar manner. In accordance with another aspect of the invention, FIG. 8A shows a gray test pattern having a uniform level of gray printed on a test surface for scanning by the arrangements previously described. A standard lithographic print is adequate. For testing purposes, the pattern is moved to a position for scanning and held in a stationary position, just as for the focus measurement. A number of scan lines are generated, each having a successively incremented threshold value applied to the data. An output pattern is generated in accordance with the imaginary data of FIGS. 9A and 9B, where for a certain number of scan lines, and threshold levels, a uniform output, or chain of ones is produced. As the incrementing threshold level nears and passes through the uniform level of gray on the test pattern, the result will become a non-uniform distribution of ones and zeroes, (as bracketed in each figure) in accordance with the amount of noise. As the threshold level exceeds the gray level on the test pattern, it will become a uniform response again, although it will be zeroes. For a numerical calculation of signal to noise ratio, the range of threshold levels over which a non-uniform scan line output is noted is examined. In accordance with FIG. 10, a numerical calculation may be implemented in a software routine as demonstrated. To summarize that method, after initializing the threshold value to zero or some other initial value, the threshold level is applied to the pixel value. If the thresholding result is the same as the previous thresholding result, uniformity is assumed, and the threshold is incremented to the next level. If the thresholding result is not the same as the previous thresholding result, a change indicates detection of noise, or a change in the thresholding result. A determination is then made as to whether the incrementing threshold level has reached either the beginning of noise, or the end of noise. Upon determining whether the change indicates the smallest threshold level or the largest threshold level, those levels are stored, and the test continues until all the threshold levels have been applied to the pixel values. Upon completion of the threshold application levels, signal to noise ratio is calculated using the formula $$\text{signal to noise ratio} = \frac{\text{largest threshold} + \text{smallest threshold}}{2 \times (\text{largest threshold} + \text{smallest threshold})}$$

The number of levels over which such non-uniform output is observed corresponds to peak to peak noise. The average over all of these nonuniform scans corresponds to signal plus noise. It should be noted that signal to noise ratio can be evaluated at different signal levels by using test patterns that have greater or lower reflectance.

Qualitative measurement is made by printing or otherwise displaying the output of the signal to noise ratio test, which, if corresponding to the imaginary data postulated in FIGS. 9A and 9B, will appear approximately as shown in FIGS. 8A and 8B. Review of this data shows the area of the break up in uniformity, and can be measured on a scale, to derive signal to noise ratio values. One way of establishing a scale for qualitative measurement of signal to noise ratio, and with reference to FIG. 11 would be to apply to range of threshold values to the pixel values a number of times consecutively over a sample sheet, and define a "noise distance" ND as the measurement over which noise or nonuniformity appears (measured in length or threshold levels) and define a "signal+noise distance" S+N as the measurement from a point at the center of the noise or nonuniformity, to the beginning of the next iteration of the threshold values applied to the pixel values. Using these measured values signal to noise ratio can be given as $$\text{signal to noise ratio} = \frac{\text{signal} + \text{noise distance}}{\text{noise distance}}$$

It will no doubt be appreciated that the test for signal to noise ratio does not necessarily require relative movement between the test pattern and the photosite array in the slow scan direction, assuming that the test pattern is uniform across a document. However, maintaining a fixed relative position between the array of photosites and the document isolates the noise of the optical system from noise caused by motion quality.

The invention has been described with reference to a preferred embodiment. Obviously modifications will occur to others upon reading and understanding the specification taken together with the drawings. This embodiment is but one example, and various alternative modifications, variations or improvements may be made by those skilled in the art from this teaching which are intended to be encompassed by the following claims.

I claim:

1. In an input scanner for deriving an electronic representation of an image from an original, having a light intensity detecting arrangement, deriving image information across a scan line in a fast scan direction, and producing a signal proportional to the intensity of light detected over a selected period from the original for a discrete area thereof; means for providing relative movement between the original and the light intensity detecting arrangement in a slow scan direction, and a thresholding arrangement applying a selected threshold value to each signal to produce a first binary output when the threshold exceeds the signal, and a second binary output the threshold does not exceed the signal, a method of examining imaging quality comprising the steps of:

a. placing a selected test pattern original at an imaging position relative to the light intensity detecting arrangement;
   b. causing the relative movement providing means to maintain said test pattern original and the light intensity detecting arrangement at fixed relative positions, whereby for each scan line produced, the same image information is derived from the test pattern original;
   c. producing signals for a plurality of scan lines;
   d. for each scan line for which signals are produced, applying a different threshold value to the signals constituting the scan line at the thresholding arrangement;
   e. detecting tranmissions in the output of the thresholding arrangement, as signals representing image information originally producing a first binary output with a first threshold value applied subsequently produce a second binary output as the threshold value is varied; and
   f. deriving image quality information from said detected transitions.

2. The method of examining imaging quality as defined in claim 1 and including the step of printing each scan line in a standard printing format.

3. In an input scanner for deriving an electronic representation of an image from an original, having a light intensity detecting arrangement, deriving image information across a scan line in a fast scan direction, and producing a signal proportional to the intensity of light detected over a selected period from the original for a discrete area thereof; means for providing relative movement between the original and said light intensity detecting arrangement, in a slow scan direction, and a thresholding arrangement applying a selected threshold value to said to each said signal to produce a first binary output when said threshold exceeds said signal, and a second binary output the threshold does not exceed said signal, a method of evaluating focus in an image scanner comprising the steps of a. placing a test pattern original at an imaging position relative to the light intensity detecting arrangement;
   b. maintain the test pattern original and the light intensity detecting arrangement at a fixed relative position in the slow scan direction, whereby for each scan line produced, the image information is derived from the test pattern original is the same;
   c. producing signals for a plurality of scan lines;

d. for each scan line, applying a successively varied threshold value from M to N to the signals constituting the scan line at the thresholding arrangement;

e. detecting a first transition in the output of the thresholding arrangement, at the threshold value where signals originally producing a first binary output with a threshold value M applied, produce a second binary output as the threshold value is varied from M to N;

f. detecting a second transition in the output of the thresholding arrangement, at the threshold value where the last signal producing a first binary output threshold value, produces a second binary output as the threshold value is varied from M to N;

g. calculating CTF using the first and second transitions as minima and maxima for the calculation:

$$\frac{max - min}{max + min}$$

4. The method as defined in claim 3, wherein the test pattern original comprises a series of generally parallel lines extending in the slow scan direction.

5. The method as defined in claim 3, the step of applying a successively varied threshold value from M to N to the signals constituting the scan line at the thresholding arrangement, proceeds along the range of M to N, and includes every threshold value available therebetween.

6. The method as defined in claim 3 and including the step of printing each scan line in a standard printing format.

7. In an input scanner for deriving an electronic representation of an image from an original, having a light intensity detecting arrangement, deriving image information across a scan line in a fast scan direction, and producing a signal proportional to the intensity of light detected over a selected period from the original from a discrete area thereof; means for providing relative movement between the original and said light intensity detecting arrangement, in a slow scan direction, and a thresholding arrangement applying a selected threshold value to said to each said signal to produce a first binary output when said threshold exceeds said signal, and a second binary output the threshold does not exceed said signal, a method of evaluating focus in an image scanner comprising the steps of a. placing a test pattern original at an imaging position relative to the light intensity detecting arrangement;

b. maintain the test pattern original and the light intensity detecting arrangement at a fixed relative position in the slow scan direction, whereby for each scan line produced, the image information is derived from the test pattern original is the same;

c. producing signals for a plurality of scan lines;

d. for each scan line, applying a successively varied threshold value from M to N to the signals constituting the scan line at the thresholding arrangement;

e. detecting a first transition in the output of the thresholding arrangement, at the threshold value where signals originally producing a first binary output with a threshold value M applied, produce a second binary output as the threshold value is varied from M to N;

f. detecting a second transition in the output of the thresholding arrangement, at the threshold value where the last signal producing a first binary output threshold value, produces a second binary output as the threshold value is varied from M to N;

g. calculating signal to noise ratio using the first and second transitions as defining the noise range for the calculation:

$$\frac{signal + noise}{noise}$$

8. The method as defined in claim 7, wherein the test pattern original comprises a a uniform level of gray across the pattern.

9. The method as defined in claim 7, the step of applying a successively varied threshold value from M to N to the signals constituting the scan line at the thresholding arrangement, proceeds along the range of M to N, and includes every threshold value available therebetween.

10. The method as defined in claim 7 and including the step of printing each scan line in a standard printing format.

* * * * *